3,557,114
1-SUBSTITUTED-3-(2-PYRIMIDINYL)
IMIDAZOLIUM SALTS
John B. Bicking, Lansdale, Pa., assignor to Merck & Co.,
Inc., Rahway, N.J., a corporation of New Jersey
No Drawing. Filed Dec. 23, 1968, Ser. No. 786,369
Int. Cl. C07d 57/00
U.S. Cl. 260—256.4                                     4 Claims

ABSTRACT OF THE DISCLOSURE 1-(alkyl or aralkyl) - 3 - (2-pyrimidinyl)imidazolium salts that exhibit hypoglycemic properties are described. The products are prepared by the reaction of a 2-halopyrimidine and a 1-alkyl- or 1-aralkylimidazole.

---

This invention is concerned with 1-(alkyl or aralkyl)-3-(2-pyrimidinyl)imidazolium salts which exhibit hypoglycemic properties, as well as methods for preparing these compounds.

The new compounds of this invention can be illustrated by the structural formula

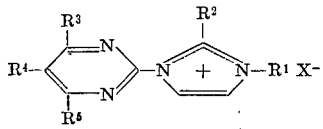

wherein $R^1$ is selected from lower alkyl preferably having from hydrogen and lower alkyl of straight or branched chain configuration or aralkyl preferably phenyl-lower alkyl such as benzyl, phenethyl, and the like; each of the variable radicals $R^2$, $R^3$ and $R^4$ are separately selected from hydrogen and lower alkyl or straight or branched chain configuration and having from 1 to 5 carbon atoms; $R^5$ is selected from hydrogen, lower alkyl having from 1 to 5 carbon atoms and being either straight or branched chain, and phenyl; and X is any pharmacologically acceptable anion including, but not limited to, bromine, chlorine, iodine, and the like.

The compounds of this invention can be prepared by the reaction of a 2-halopyrimidine with the required 1-alkyl- or 1-aralkylimidazole. The 2-halo substituent preferably is chloro or bromo. The reaction advantageously is carried out in the presence of a solvent, a lower alcohol such as methanol, ethanol, isopropanol, butanol and the like being quite suitable, although other suitable solvents such as acetonitrile or dimethylformamide can be used instead. The reaction also is facilitated by heating at temperatures up to and including the reflux temperature of the reaction mixture.

The compounds of this invention exhibit hypoglycemic activity and therefore are useful in lowering abnormally high blood sugar levels in warm-blooded animals as demonstrated by their effectiveness in lowering the blood sugar levels when administered to rats made diabetic by prior treatment with streptozotocin. Lowering of blood sugar levels in this test system is effected at dosages that do not produce gross toxic symptoms, and is evidence of potential clinical utility for this purpose.

The compounds of this invention can be administered in unit dosage forms containing from about 50 mgs. to about 150 mgs. per unit dosage for administration orally or parenterally. Examples of suitable dosage forms include tablets, capsules, pills, powders, granules, wafers, etc. which can be prepared by conventional methods known to those skilled in this art.

The preparation of representative compounds of this invention is described in greater detail in the following examples that are presented to illustrate the best mode known to applicant for the preparation of the novel hypoglycemic products of this invention.

EXAMPLE 1

1-methyl-3-(2-pyrimidinyl)imidazolium chloride

A mixture of 1-methylimidazole (2.46 g.; 0.03 mole), 2-chloropyrimidine (3.44 g.; 0.03 mole) and isopropyl alcohol (10 ml.) is heated under reflux with stirring for 30 hours. The reaction solution is treated with ethyl acetate (25 ml.) to precipitate 1.81 g. (31%) of product in the form of a white solid. Recrystallization from acetonitrile provides 1-methyl-3-(2-pyrimidinyl)imidazolium chloride in the form of white rods, M.P. 221–222° C.

Analysis.—Calculated for $C_8H_9ClN_4$ (percent): C, 48.86; H, 4.61; N, 28.49. Found (percent): C, 48.91; H, 4.59; N, 28.41.

EXAMPLE 2

1,2-dimethyl-3-(2-pyrimidinyl)imidazolium chloride

A solution of 1,2-dimethylimidazole (3.2 g.; 0.033 mole) and 2-chloropyrimidine (3.44 g.; 0.03 mole) in isopropyl alcohol (5 ml.) is boiled under reflux for 17 hours. The reaction mixture is cooled to cause the product to crystallize. The product is collected and recrystallized from isopropyl alcohol to yield 2.1 g. (33%) of 1,2-dimethyl - 3 - (2-pyrimidinyl)imidazolium chloride, M.P. 267.5–268.5° C. (dec.).

Analysis.—Calculated for $C_9H_{11}ClN_4$ (percent): C, 51.31; H, 5.26; N, 26.60. Found (percent): C, 51.51; H, 5.20; N, 26.55.

EXAMPLE 3

1-benzyl-3-(2-pyrimidinyl)imidazolium
chloride·¾ $H_2O$

A mixture of 1-benzylimidazole (4.75 g.; 0.03 mole), 2-chloropyrimidine (3.44 g.; 0.03 mole) and isopropyl alcohol (10 ml.) is heated under reflux with stirring for 24 hours. The reaction solution is treated with ethyl acetate (75 ml.) to precipitate 4.00 g. (49%) of product in the form of a white solid. Recrystallization from acetonitrile gives the product in the form of white prisms melting at 135–136° C. After drying at 82° C. for 5 hours the melting point is raised to 190–192° C. Elementary analysis and N.M.R. spectrum shows that this is 1-benzyl-3-(2-pyrimidinyl)imidazolium chloride containing ¾ mole of water of hydration.

Analysis.—Calculated for $C_{14}H_{13}ClN_4·¾ H_2O$ (percent): C, 58.74; H, 5.11; N, 19.57. Found (percent): C, 58.75; H, 5.37; N, 19.35.

By following the procedure described in Example 1, but employing the 2-halopyrimidine and the 1-substituted imidazole reactants identified in the following table there are obtained additional 1-(alkyl or aralkyl)-3-(2-pyrimidinyl)imidazolium quaternary salts having the substituents $R^1$, $R^2$, $R^3$, $R^4$, and $R^5$ identified in Table I.

TABLE I

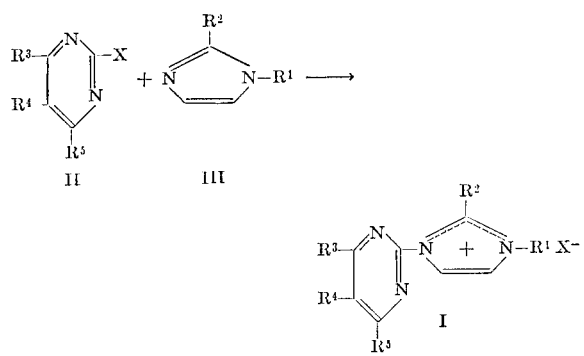

| Example No.: | $R_3$ | $R_4$ | $R_5$ | $R_1$ | $R_2$ | X |
|---|---|---|---|---|---|---|
| 4 | H | H | H | $CH_3$ | $CH_3$ | Br |
| 5 | $C_2H_5$ | H | H | $CH-CH_2$ with $CH_3$ / $CH_3$ | $CH_3$ | Cl |
| 6 | H | $CH_3$ | H | $C_6H_5CH_2CH_2$ | H | Cl |
| 7 | $CH_3$ | H | H | $CH_3$ | $CH_3$ | Cl |
| 8 | $CH_3$ | H | $CH_3$ | $CH_3$ | $C_2H_5$ | Cl |
| 9 | $CH_3$ | H | $C_6H_5$ | $CH_3$ | H | Cl |

The following example describes a typical formulation for oral administration of the products of this invention. Each of the products can be formulated in the manner described below employing from about 50 to 150 mgs. of active ingredient per tablet. In the following formulation the product of Example 1, that is 1-methyl-3-(2-pyrimidinyl)imidazolium chloride, is employed as the active ingredient.

EXAMPLE 9

| | Mgs./tablet |
|---|---|
| Active ingredient | 50 |
| Corn starch | 75 |
| Talc | 14 |
| Magnesium stearate | 2 |
| Hydroxypropylmethylcellulose | 4 |
| Titanium dioxide | 4 |
| Propylene glycol | 1 |

Sufficient water is added to the starch to form a thick paste which then is intimately mixed with the active ingredient. If necessary, a small additional amount of water is added for thorough mixing of these ingredients and thereafter the water is removed by drying in an oven. After thorough drying, the material is ground, the magnesium stearate and talc are added and intimately mixed with the ground material and the mixture then is passed through a No. 10 screen and compressed into tablets. The hydroxypropylmethylcellulose and titanium dioxide are suspended in the propylene glycol and then mixed with a mixture of alcohol and chloroform (50:50) which is used as the film coating material. This mixture is poured or sprayed into a coating pan in which the tablets are rotating thereby film coating the tablets.

Other formulations comprising more or less of active ingredient can be prepared by conventional methods for oral or parenteral administration on a 1 to 4 times a day regimen.

What is claimed is:
1. A 1-substituted-3-(2-pyrimidinyl)imidazolium salt having the structural formula

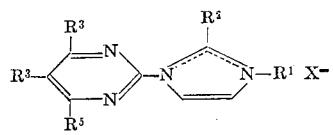

wherein $R^1$ is selected from the group consisting of lower alkyl and phenyl-lower alkyl; $R^2$, $R^3$, and $R^4$ are each separately selected from hydrogen and lower alkyl; $R^5$ is selected from hydrogen, lower alkyl and phenyl; and X is a pharmacologically acceptable halide.

2. A product as claimed in claim 1 wherein the variable radicals $R^2$, $R^3$, $R^4$, and $R^5$ each represent hydrogen.

3. A product as claimed in claim 1 wherein $R^2$ is lower alkyl and $R^3$, $R_4$ and $R^5$ each represent hydrogen.

4. 1-methyl-3-(2-pyrimidinyl)imidazolium chloride.

References Cited

UNITED STATES PATENTS 3,042,675  7/1962  Rogers et al. _____ 260—256.4

OTHER REFERENCES

Hoffmann, Imidazole and Its Derivatives, Part I, Interscience, New York, 1953, p. 132.

ALEX MAZEL, Primary Examiner

R. J. GALLAGHER, Assistant Examiner

U.S. Cl. X.R.

424—251

UNITED STATES PATENT OFFICE
CERTIFICATE OF CORRECTION

Patent No. 3,557,114     Dated January 19, 1971

Inventor(s) John B. Bicking

It is certified that error appears in the above-identified patent and that said Letters Patent are hereby corrected as shown below:

In column 1, line 35, delete the entire line and add in its place ---from 1 to 5 carbon atoms and being straight or branched---.

Signed and sealed this 22nd day of June 1971.

(SEAL)
Attest:

EDWARD M. FLETCHER, JR.
Attesting Officer

WILLIAM E. SCHUYLER, JR.
Commissioner of Patents